(12) United States Patent
Takamori

(10) Patent No.: US 8,737,823 B2
(45) Date of Patent: May 27, 2014

(54) DISK REPRODUCING DEVICE AND VIDEO DATA OUTPUT METHOD

(75) Inventor: Tomotsugu Takamori, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 2039 days.

(21) Appl. No.: 11/645,184

(22) Filed: Dec. 26, 2006

(65) Prior Publication Data

US 2007/0147799 A1    Jun. 28, 2007

(30) Foreign Application Priority Data

Dec. 27, 2005  (JP) ................. P2005-375042

(51) Int. Cl.
*H04N 5/93*      (2006.01)
*H04N 5/89*      (2006.01)
*H04N 21/234*    (2011.01)

(52) U.S. Cl.
CPC ................. *H04N 21/23418* (2013.01)
USPC .......................... 386/353; 386/335

(58) Field of Classification Search
CPC ........... H04N 21/4402; H04N 21/440209; H04N 21/23418
See application file for complete search history.

(56) References Cited

U.S. PATENT DOCUMENTS

| 2002/0135605 A1 | 9/2002 | Kim ........................ 345/698 |
| 2004/0046772 A1 | 3/2004 | Ouchi et al. ............... 345/690 |
| 2005/0027993 A1 | 2/2005 | Yanagisawa ............... 713/189 |
| 2005/0068346 A1* | 3/2005 | Ogawa et al. ............ 345/699 |
| 2006/0238524 A1* | 10/2006 | Hsieh et al. ............. 345/204 |

FOREIGN PATENT DOCUMENTS

| EP | 1 519 263 A2 | 3/2005 |
| JP | A-2005-109703 | 4/2005 |
| JP | A-2005-167895 | 6/2005 |

\* cited by examiner

*Primary Examiner* — William C Vaughn, Jr.
*Assistant Examiner* — Asher Khan
(74) *Attorney, Agent, or Firm* — Morgan, Lewis & Bockius LLP

(57) ABSTRACT

A disk reproducing device which is connected to a television device meeting an HDMI standard and is operable to output information data that has a native format and is recorded on a disk to the television device, includes: an obtaining unit, operable to obtain an EDID including video resolution information which is transmitted from the television device; a discriminating unit, operable to discriminate whether or not the native format is present in the video resolution information; and an outputting unit, operable to output the information data to the television device in the native format, in a case where the discriminating unit discriminates that the native format is present in the video resolution information.

4 Claims, 2 Drawing Sheets

CEA DATA BLOCK COLLECTION

| BYTE NO. | DESCRIPTION | |
|---|---|---|
| 1 | VIDEO TAG CODE | VIDEO DATA BYTE LENGTH ($L_1$) |
| 2 | CEA SHORT VIDEO DESCRIPTOR 1 | |
| ⋮ | ⋮ | |
| $L_1 + 1$ | CEA SHORT VIDEO DESCRIPTOR $L_1$ | |
| ⋮ | ⋮ | |

CEA SHORT VIDEO DESCRIPTOR

| BYTE # | 7 | 6 | 5 | 4 | 3 | 2 | 1 | 0 |
|---|---|---|---|---|---|---|---|---|
| 1 | NATIVE | VIDEO IDENTIFICATION CODE | | | | | | |

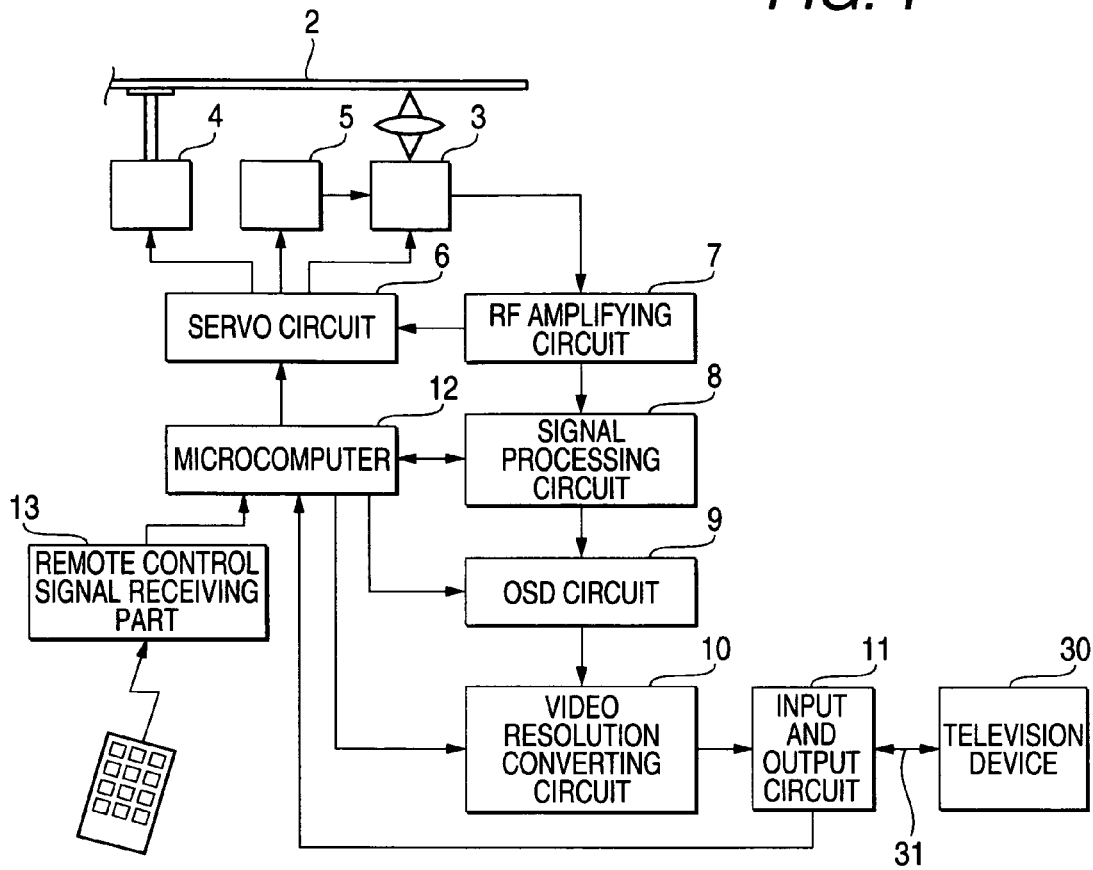

DISK REPRODUCING DEVICE AND VIDEO DATA OUTPUT METHOD

BACKGROUND OF THE INVENTION

The present invention relates to a disk reproducing device for reproducing video and audio data recorded on an optical disk and a video data output method, and more particularly to a disk reproducing device for outputting video data in a native format when a television device meeting an HDMI (High Definition Multimedia Interface) standard meets the native format and a video data output method thereof.

Recently, with the propagation of a digital terrestrial broadcasting of a television broadcast, a television device that can display the video data of a high image quality of a digital signal has been spread. The television device that can display the video data of the high image quality of the digital signal can select one video format among a plurality of video formats, for instance, 480p, 480i, 720p, 1080i and display the video data on a screen in the selected video format. Further, a television device having an HDMI terminal that meets an HDMI standard has been also spread. In the HDMI standard, digital video and audio data and video display information of the television device can be transmitted and received through an HDMI connecting cable. When the television device that meets the HDMI standard is connected to the HDMI terminal of a disk reproducing device by the HDMI connecting cable to reproduce the video and audio data recorded on an optical disk such as a DVD (Digital Versatile Disc) and to output the video and audio data to the television device, an EDID (Extended Display Identification Data) transmitted from the television device is obtained to select an aspect ratio of the television device capable of being displayed and one of video formats from the video display information of the obtained EDID so that the video data can be converted to the selected video format and outputted to the television device. Accordingly, when the television device is connected to disk reproducing device, a problem arises that the video format of the video data outputted to the television device from the disk reproducing device needs to be selected depending on a video format that the television device to which the disk reproducing device is connected can meet.

In a related art, the information of a display condition of a monitor device meeting the HDMI standard is obtained, video data is converted in accordance with the obtained information of the display condition and the converted video data is outputted to the monitor device (for instance, see JP-A-2005-109703).

Further, in another related art, the video format information of a video display device that can be displayed is detected and compared with video format information that can be converted and a video format that can be selected is displayed on a screen to select the video format (for instance, see JP-A-2005-167895).

However, in JP-A-2005-109703, when the monitor device meets a plurality of video formats, if other video format is selected, a problem arises that the video data is converted into the selected video format and outputted.

Further, in JP-A-2005-167895, a problem undesirably arises that when video data is outputted to the video display device, a user needs to select the video format in which the video display device can display.

SUMMARY

It is therefore an object of the invention to provide a disk reproducing device that can output video data to a television device in a native format without converting the video format of the video data when the television device that meets an HDMI standard meets the native format of the video data reproduced from an optical disk and a video data output method thereof.

In order to achieve the object, according to the invention, there is provided a disk reproducing device for reproducing and outputting video and audio data to a television device meeting an HDMI standard, the disk reproducing device comprising:

obtaining means for obtaining an EDID transmitted from the television device meeting the HDMI standard which is connected to the disk reproducing device;

discriminating means for discriminating whether or not a native format is present in video resolution information of the EDID obtained by the obtaining means;

output means for selecting the native format and outputting video data reproduced from an optical disk to the television device connected to the disk reproducing device in the native format, in a case where the discriminating means discriminates that the native format is present in the video resolution information of the EDID; and display means for displaying on a screen of the television device that the television device connected to the disk reproducing device does not meet the native format of the video data reproduced from the optical disk, in a case where the discriminating means discriminates that the native format is not present in the video resolution information of the EDID.

In order to achieve the object, according to the invention, there is also provided a disk reproducing device which is connected to a television device meeting an HDMI standard and is operable to output information data that has a native format and is recorded on a disk to the television device, the disk reproducing device comprising:

an obtaining unit, operable to obtain an EDID including video resolution information which is transmitted from the television device;

a discriminating unit, operable to discriminate whether or not the native format is present in the video resolution information; and an outputting unit, operable to output the information data to the television device in the native format, in a case where the discriminating unit discriminates that the native format is present in the video resolution information.

The disk reproducing device may further include a displaying unit, operable to display on a screen of the television device that the television device does not meet the native format, in a case where the discriminating unit discriminates that the native format is not present in the video resolution information.

In order to achieve the object, according to the invention, there is also provided a video data output method of a disk reproducing device which reproduces and outputs video and audio data to a television device meeting an HDMI standard, the video data output method comprising:

obtaining an EDID transmitted from the television device meeting the HDMI standard which is connected to the disk reproducing device;

deciding whether or not a native format is present in video resolution information of the obtained EDID;

selecting the native format and outputting video data reproduced from an optical disk to the television device connected to the disk reproducing device in the native format, in a case where it is decided that the native format is present in the video resolution information of the obtained EDID; and displaying on a screen of the television device that the television device connected to the disk reproducing device does not meet the native format of the video data reproduced from the optical disk, in a case where it is decided that the native format is not present in the video resolution information of the obtained EDID.

BRIEF DESCRIPTION OF THE DRAWINGS

FIG. 1 is a block diagram showing the structure of a disk reproducing device of one embodiment of the present invention.

FIG. 2 is an explanatory view showing a format of EDID data.

DETAIL DESCRIPTION OF PREFERRED EMBODIMENTS

Figure 3:
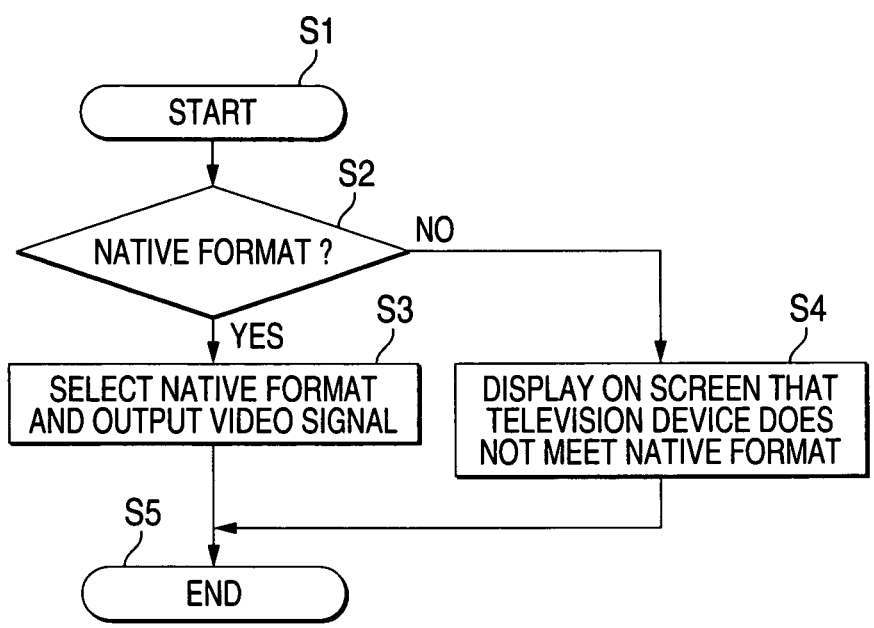
FIG. 3 is a flowchart showing an operation of the disk reproducing device of one embodiment of the present invention.

Now, a best mode for carrying out the present invention will be described below in detail by properly referring to the drawing.

A disk reproducing device 1 includes an optical puck-up 3 for applying a laser beam to an optical disk 2, detecting the reflected light from the optical disc 2 and reading video and audio data recorded on the optical disk 2, a spindle motor 4 for rotating the optical disk 2, a thread motor 5 for thread-moving the optical pick-up 3 in the radial direction of the optical disk 2, a servo circuit 6 for servo-controlling the rotating speed of the spindle motor 4 and the rotating direction and the rotating speed of the thread motor 5 to servo-control the tracking and the focus of the optical pick-up 3 in accordance with a tracking error signal and a focus error signal detected by the optical pick-up 3, an RF amplifying circuit 7 for amplifying an RF signal (Radio Frequency) of the video and audio data read by the optical pick-up 3, a signal processing circuit 8 for synchronously detecting and demodulating the RF signal of the video and audio data amplified by the RF amplifying circuit 7 on the basis of a reference clock, correcting the error of the demodulated video and audio data, extending the video and audio data compressed in accordance with a prescribed compression system and decoding the extended video and audio data to reproduce the video and audio data, an OSD (On-Screen Character Display) circuit 9 for superimposing character data on video data to display the character data on a screen of a television device 30, a video resolution converting circuit 10 for converting the video format of the video data, an input and output circuit 11 for receiving a signal transmitted from the television device 30 meeting an HDMI standard and outputting the video and audio data to the television device 30 meeting the HDMI standard, a microcomputer 12 for controlling the entire part of the system of the disk reproducing device 1 and a remote control signal receiving part 13 for receiving a remote control signal of an infrared ray signal transmitted from a remote controller 20 to convert the remote control signal to a prescribed electric signal. The disk reproducing device 1 and the television device 30 have HDMI terminals (not shown in the drawing) connected to each other by an HDMI connecting cable 31.

Now, the operation of the disk reproducing device constructed as described above will be described below.

When the television device 30 meeting the HDMI standard is connected to the HDMI terminal (not shown in the drawing) of the disk reproducing device 1 by the HDMI connecting cable 31, the microcomputer 12 obtains an EDID transmitted from the television device 30 connected to the disk reproducing device 1 to discriminate whether or not a native format is present in the video resolution information of the CEA Short Video Descriptor of the CEA Data Block Collection of the obtained EDID. Here, the native format is one of a plurality of the video formats, and is a recommended value of the television device 30 for displaying the video data. When the video data resolution of the television device 30 meets the native format, information meeting the native format is included in the seventh bit of the CEA Short Video Descriptor of the second byte of the CEA Data Block collection of the EDID (see FIG. 2).

When the native format is present in the CEA Short Video Descriptor of the video resolution information of the EDID obtained from the television device 30, the microcomputer 12 transmits a control signal to the servo circuit 6 to drive the spindle motor 4, rotate the optical disk 2, drive the thread motor 5 and move the optical pick-up 3 in the radial direction of the optical disk 2. Then, the microcomputer 12 controls the tracking and the focus of the optical pick-up to read and reproduce the video and audio data recorded on the optical disk 2 by the optical pick-up 3, transmits the control signal to the video resolution converting circuit 10, selects the native format of the video format in the video resolution converting circuit 10 and outputs the video and audio data reproduced from the optical disk 2 to the television device 30 connected to the disk reproducing device 1 in the native format without converting the resolution of the video data reproduced from the optical disk 2.

Further, when the native format is not present in the video resolution information of the EDID transmitted from the television device 30, the microcomputer 12 transmits the character data and the control signal to the OSD circuit 9 to display on the screen of the television device 30 that the television device 30 connected to the disk reproducing device 1 does not meet the native format of the video format of the video data reproduced from the optical disk 2 and informs a user of the fact (not illustrated).

The operation of the disk reproducing device of one embodiment of the present invention will be described with reference to a flowchart shown in FIG. 3.

When the television device meeting the HDMI standard is connected to the disk reproducing device by the HDMI connecting cable, the procedure advances to step S2 from step S1. In the step S2, the EDID transmitted from the television device meeting the HDMI standard which is connected to the disk reproducing device is obtained to decide whether the native format is present in the video resolution information of the obtained EDID. When the native format is present in the video resolution information of the obtained EDID, the procedure advances to step S3. When the native format is not present in the video resolution information of the obtained EDID, the procedure advances to step S4.

In the step S3, the native format of the video format is selected and the video data is outputted to the television device connected to the disk reproducing device in the native format without converting the resolution of the video data reproduced from the optical disk, and the procedure advances to step S5 to finish processes.

In the step S4, it is displayed on the screen of the television device that the television device connected to the disk reproducing device does not meet the native format of the video data reproduced from the optical disk, and the procedure advances to the step S5 to finish processes.

The best mode for carrying out the present invention is described above in detail. However, the present invention is not limited thereto and it is to be understood to a person with ordinary skill in the art that modifications or improvements thereof may be made within the knowledge of the person with ordinary skill.

In a disk reproducing device according to the present invention, when the television device meeting the HDMI standard meets the native format of the video data reproduced from the optical disk, the video data can be outputted to the television device in the native format without converting the video format of the video data. Further, when the television device does not meet the native format of the video data reproduced from the optical disk, a user can be informed that the television device does not meet the native format of the video data reproduced form the optical disk.

What is claimed is:

1. A disk reproducing device for reproducing and outputting video and audio data to a television device meeting a HIGH DEFINITION MULTIMEDIA INTERFACE standard, the disk reproducing device comprising:
  an obtaining unit that obtains an EXTENDED DISPLAY IDENTIFICATION DATA transmitted from the television device meeting the HIGH DEFINITION MULTIMEDIA INTERFACE standard which is connected to the disk reproducing device;
  a discriminating unit that discriminates whether or not a native format of the video data reproduced from a disk is present in a CEA Short Video Descriptor of the EXTENDED DISPLAY IDENTIFICATION DATA obtained by the obtaining unit;
  an outputting unit that selects the native format and outputs video data reproduced from an optical disk to the television device connected to the disk reproducing device in the native format without converting a video format of the video data, in a case where the discriminating unit discriminates that the native format is present in the CEA Short Video Descriptor of the EXTENDED DISPLAY IDENTIFICATION DATA; and
  displaying unit that causes a screen of the television device to display that the television device connected to the disk reproducing device does not meet the native format of the video data reproduced from the optical disk, in a case where the discriminating unit discriminates that the native format is not present in the CEA Short Video Descriptor of the EXTENDED DISPLAY IDENTIFICATION DATA.

2. A disk reproducing device which is connected to a television device meeting a HIGH DEFINITION MULTIMEDIA INTERFACE standard and is operable to output information data that has a native format and is recorded on a disk to the television device, the disk reproducing device comprising:
  an obtaining unit, operable to obtain an EXTENDED DISPLAY IDENTIFICATION DATA including a CEA Short Video Descriptor which is transmitted from the television device;
  a discriminating unit, operable to discriminate whether or not the native format of the video data reproduced from the disk is present in the CEA Short Video Descriptor; and
  an outputting unit, operable to output the information data to the television device in the native format without converting a format of the information data, in a case where the discriminating unit discriminates that the native format is present in the CEA Short Video Descriptor.

3. The disk reproducing device according to claim 2, further comprising:
  a displaying unit, operable to cause a screen of the television device to display that the television device does not meet the native format, in a case where the discriminating unit discriminates that the native format is not present in the CEA Short Video Descriptor.

4. A video data output method of a disk reproducing device which reproduces and outputs video and audio data to a television device meeting a HIGH DEFINITION MULTIMEDIA INTERFACE standard, the video data output method comprising:
  obtaining an EXTENDED DISPLAY IDENTIFICATION DATA transmitted from the television device meeting the HIGH DEFINITION MULTIMEDIA INTERFACE standard which is connected to the disk reproducing device;
  deciding whether or not a native format of the video data reproduced from the disk is present in a CEA Short Video Descriptor of the obtained EXTENDED DISPLAY IDENTIFICATION DATA;
  selecting the native format and outputting video data reproduced from an optical disk to the television device connected to the disk reproducing device in the native format without converting a video format of the video data, in a case where it is decided that the native format is present in the CEA Short Video Descriptor of the obtained EXTENDED DISPLAY IDENTIFICATION DATA; and
  displaying on a screen of the television device that the television device connected to the disk reproducing device does not meet the native format of the video data reproduced from the optical disk, in a case where it is decided that the native format is not present in the CEA Short Video Descriptor of the obtained EXTENDED DISPLAY IDENTIFICATION DATA.

* * * * *